Figure 3:
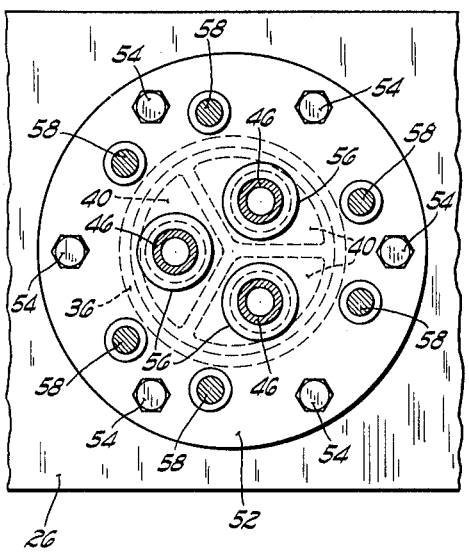

March 15, 1966 P. J. WYNNE 3,240,856
ELECTRIC ARC FURNACE
Filed June 11, 1963 2 Sheets-Sheet 1
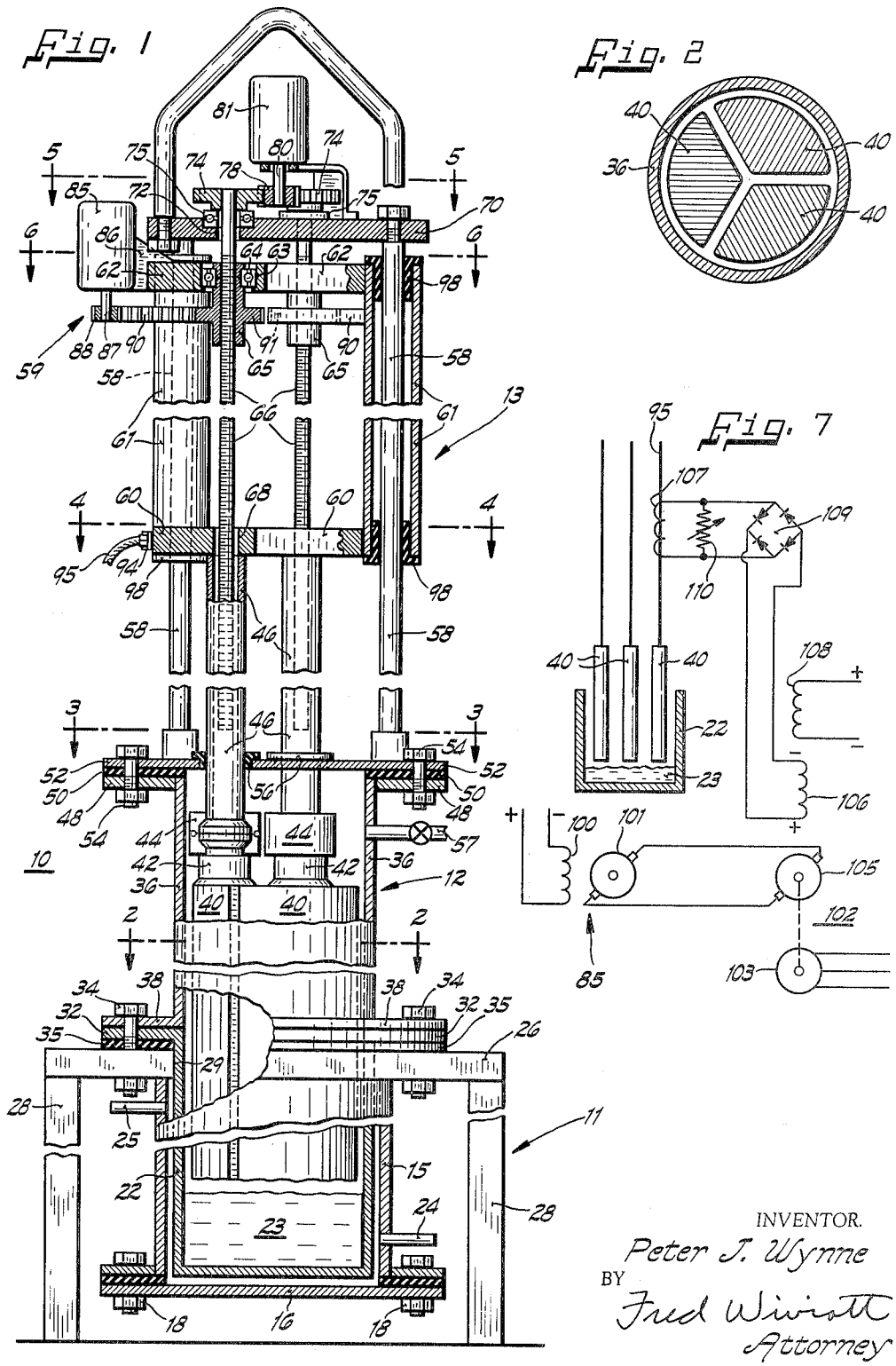
INVENTOR.
Peter J. Wynne
BY
Fred Wiviott
Attorney March 15, 1966

P. J. WYNNE 3,240,856

ELECTRIC ARC FURNACE

Filed June 11, 1963

2 Sheets-Sheet 2

INVENTOR.
Peter J. Wynne
BY Fred Wiviott
Attorney

United States Patent Office 3,240,856
Patented Mar. 15, 1966

3,240,856
ELECTRIC ARC FURNACE
Peter Joseph Wynne, Pittsburgh, Pa., assignor to McGraw-Edison Company, Milwaukee, Wis., a corporation of Delaware
Filed June 11, 1963, Ser. No. 287,080
10 Claims. (Cl. 13—14)

This invention relates to electric arc furnaces and more particularly to apparatus for positioning the electrodes in a polyphase consumable electrode arc melting furnace.

Consumable electrode arc furnaces have been widely used for such applications as the melting of refractory metals of which titanium is an example. Such furnaces, in general, include a sealed chamber wherein a consumable electrode is progressively melted and the resulting molten metal collected in a crucible to form an ingot. Melting is accomplished by means of an arc which is drawn between the consumable electrode and the ingot and which is sustained by relatively large direct currents. As the ingot is formed, the electrode length gradually decreases so that it must be lowered in order to maintain the desired arc length and melting conditions.

It has been found that by employing a three-phase energy source to supply three individual electrodes a relatively larger ingot may be cast and, in addition, the expense involved in converting readily available three-phase alternating current to direct current is eliminated. However, for various reasons, the individual electrodes of such three-phase furnaces are not evenly consumed. For this reason, means must be provided for individually feeding each electrode towards the crucible in accordance with the rate at which it is being consumed.

It is an object of the invention to provide a new and improved mechanism for simultaneously feeding the consumable electrodes of a polyphase arc melting furnace at individual rates of speed in accordance with the rate at which they are being consumed.

It is another object of the invention to provide an electrode feeding mechanism for consumable electrode arc melting furnaces which is relatively inexpensive and compact.

Another object of the invention is to provide a polyphase consumable electrode arc melting furnace having an individual differential assembly for each phase wherein one input of each assembly is uniformly and simultaneously driven in one direction by a first motive means and a second input of each assembly is independently driven by a plurality of second motive means in accordance with their independent electrode conditions. Yet another object of the invention is to provide such furnaces wherein each differential assembly includes a screw shaft and a nut threaded thereon.

A further object of the invention is to provide a three phase vacuum consumable electrode arc melting furnace with a differential means for each electrode and each of which has a first portion uniformly and simultaneously driven in one direction by a first motive means and wherein each differential means also has a second portion continuously driven in the opposite direction by an individual motive means and at a speed regulated in accordance with its individual electrode's arc conditions. Another object of the invention is to provide such differential means wherein said first motive means is an A.C. motor and wherein each of said individual motive means is a D.C. motor.

Yet another object of the invention is to provide an electrode feeding mechanism having a first input connected to a first motor running at a constant speed and a second motor running at a speed controlled by the electrode arc conditions wherein one input includes a screw shaft and the other input includes a nut threadably engaging the screw shaft.

Figure 4:
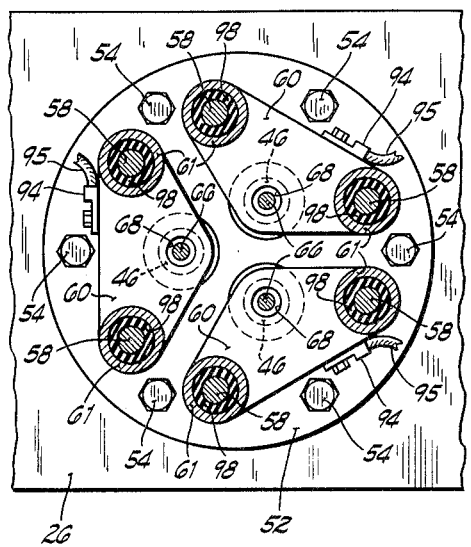
Figure 5:
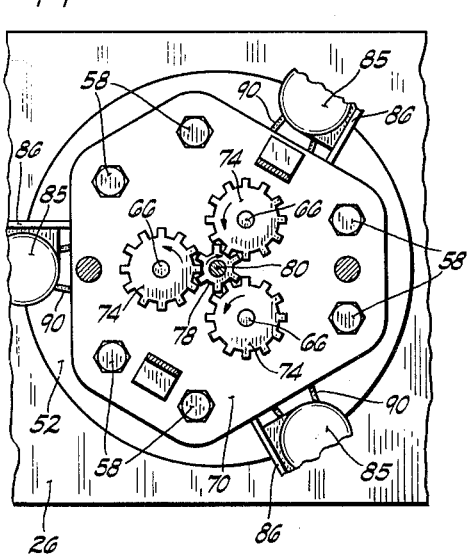
Figure 6:
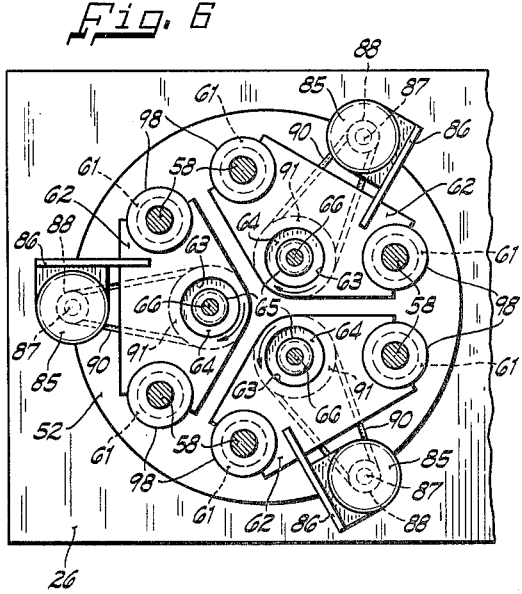

These and other objects and advantages of the instant invention will become more apparent from the detailed description thereof taken with the accompanying drawings wherein:

FIG. 1 is a side elevational view with parts broken away of a three phase consumable electrode arc melting furnace incorporating the instant invention;
FIG. 2 is a view taken along lines 2—2 of FIG. 1;
FIG. 3 is a view taken along lines 3—3 of FIG. 1;
FIG. 4 is a view taken along lines 4—4 of FIG. 1;
FIG. 5 is a view taken along lines 5—5 of FIG. 1;
FIG. 6 is a view taken along lines 6—6 of FIG. 1; and
FIG. 7 is a circuit diagram of a portion of the electrode drive means according to the instant invention.

Referring now to the drawings in greater detail, FIG. 1 shows a three-phase consumable electrode arc melting furnace designated generally by the reference number 10 and having a crucible section 11, an intermediate throat section 12 and an upper electrode drive assembly 13.

The crucible section 11 includes an outer substantially cylindrical shell 15 having a bottom closure member 16 which is affixed thereto in a hermetically sealed relation by means of bolts 18 to provide a cooling jacket for a crucible 22 disposed therewithin and which receives the ingot 23 formed from the metal being melted. The shell 15 is provided with a cooling fluid inlet pipe 24 and an outlet pipe 25. A horizontal mounting plate 26 is supported adjacent the upper end of the shell 15 by vertical columns 28 and has a central aperture 29 for receiving the upper end of the crucible 22. A flange 32 extends outwardly from the upper end of the crucible 22 and is affixed to the upper surface of the mounting plate 26 by bolts 34. A gasket 35 is disposed around the periphery of the aperture 29 and below the flange 32.

The throat section 12 of the furnace 10 includes an outer cylindrical housing 36 which is substantially coradial with the crucible 22 and is affixed to the upper end thereof by the bolts 34 which engage an outwardly extending flange 38 at its lower end.

Three electrodes 40 are disposed within the throat housing 36 and, as seen in FIG. 2, each preferably has a a sector shape. A stub 42 is integrally formed at the upper end of each of the electrodes 40 and each is releasably attached to the bottom of one of three hollow electrode rams 46 by means of clamps 44.

A flange 48 extends outwardly from the upper end of the throat housing 36 for receiving an annular gasket 50 and a cover plate 52 which are attached to the flange 48 by bolts 54. The cover plate 52 forms a closure for the hollow assembly comprising the crucible 22 and the throat housing 36. The electrode rams 46 are equally spaced from each other and slidably pass through sealing bushings 56 which electrically insulate the electrode rams 46 from each other and from the cover plate 52. Also affixed to the cover plate 52 are the lower ends of vertically extending rods 58 which support the electrode drive assembly 13.

A pipe 57 is connected to and communicates with the interior of the throat housing 36 for placing the latter in communication with an evacuator or source of inert gas if a partial vacuum or inert gas atmosphere is required during a melting operation.

A generally triangularly shaped first plate 60 is affixed to the upper end of each of the electrode rams 46. A tubular member 61 is slidably disposed on each of the support rods 58 and each is affixed at its lower end to the first or lower plates 60. A trio of second or upper triangular plates 62 is disposed in spaced relation above the lower plates 60 and substantially parallel thereto by being connected to the upper ends of the tubular members 61.

The electrode drive assembly 13 includes three differential devices 59, one being associated with each electrode ram and each including a screw shaft 66 which constitutes one input thereof and a nut 65 threadably engaging the shaft 66 which constitutes a second input thereof. Each of the upper plates 62, which constitutes an output for its associated differential device, has an aperture 63 formed therein for receiving a ball bearing assembly 64 which rotatably supports one of the nuts 65. The screw shafts 66 each extend coaxially through an aperture 68 formed in each of the lower triangular plates 60 and into the hollow interior of the electrode rams 46.

The electrode drive assembly 13 also includes a first motive means for uniformly and simultaneously driving each of the screws 66 in a manner tending to move the electrodes in one direction and second motive means which individually turns each of the nuts 65 in a manner tending to move the electrodes in an opposite direction according to the individual arc conditions so that each electrode will be individually driven. The first motive means consists of a synchronous A.C. motor 81 suitably mounted above a top plate 70 affixed to the upper ends of the guide rods 58. The second motive means consists of three individual D.C. motors 85 which are mounted adjacent the upper plates 62 by brackets 86 so that their output shafts 87 are parallel to the axis of their associated nut 65 and screw shaft 66. A pulley 88 is affixed to the output shaft 87 of each of the D.C. motors 85 and each is connected by a belt 90 to a pulley portion 91 integrally formed on its associated nut 65.

As seen particularly in FIGS. 1 and 5, the top plate 70 has three apertures 72 to permit the passage of the upper end of the screw shafts 66. Three spur gears 74 are rotatably mounted on the top plate 70 by ball bearing assemblies 75 and each is coaxial with one of the apertures 72 and is affixed to the upper end of one of the screw shafts 66. The spur gears 74 are equidistantly spaced from each other and each meshingly engages a central pinion 78 which is affixed to the output shaft 80 of the A.C. motor 81.

Energy is supplied to each of the electrodes through a terminal 94 which is constructed and arranged to receive a flexible phase conductor 95. Current flows from the plates 60 through the electrode rams 44, the clamps 46, the stubs 42 and to the electrodes 40. Insulating bushings 98, of any suitable material such as fluorinated hydrocarbon, insulates the guide rods 58 from the lower and upper ends of the tubes 61 which are respectively affixed to the plates 60 and 62.

FIG. 7 schematically illustrates the control circuit for each of the D.C. motors 85 which have a field coil 100 connected to a uniform D.C. current source and a rotor winding 101 which is connected to a motor-generator set 102. The motor-generator set 102 is of the Ward-Leonard type and includes an A.C. motor 103 connected to a source of three phase energy for driving a D.C. generator 105 at a constant speed. A first field winding 106 of the D.C. generator 105 is coupled to the electrode phase supply conductor 95 for receiving an electrical quantity corresponding to the electrical conditions in the arc, such as, by means of a current transformer 107 and a full wave rectifier 109. This provides a voltage signal across resistor 110 proportional to arc current, although those skilled in the art will appreciate that a voltage signal proportional to arc voltage could, as an alternative, be applied to the winding 106 for electrode control. In addition, a second field winding 108 is connected to a constant D.C. source. The field windings 106 and 108 are connected in opposition with the winding 108 having a substantially larger field strength.

It will be appreciated that as the electrode 40 approaches the ingot 23 current flowing in the electrode 40 will increase and conversely as the arc gap between the electrode 40 and the ingot 23 grows longer the electrode current will decrease. A current proportional to that flowing in the electrode phase supply conductor 95 will be derived in the secondary of the current transformer 107 which, in turn, derives a proportional voltage across a shunting resistor 110. This alternating voltage will be rectified by the full wave rectifier 109 and accordingly the first field winding of the D.C. generator 105 will receive a D.C. voltage proportional to the current flowing in electrode 40 and this voltage will act to decrease the total field strength of the generator 105. Thus, the output voltage of the D.C. generator 105 and hence the rotational speed of the D.C. motor 101 will be governed by the current in electrode 40 whereby, as the electrode current increases the output of the generator will decrease and conversely as the electrode current decreases the generator output will increase. While only one control circuit is shown, it will be appreciated that identical control circuits will be provided for each of the electrodes 40 and each will be connected to its associated D.C. motor 85.

The A.C. motor 81, which is preferably of the synchronous type, rotates at a constant speed in a clockwise direction as viewed in FIG. 5. This turns each of the spur gears 74 and accordingly, their associated screw shafts 66 in a counterclockwise direction.

Referring again to FIG. 6, each of the D.C. motors 85 is arranged to drive its pulley 88, its belt 90 and the integral pulley 91 on its associated nut 85 in a counterclockwise direction. Thus, it can be seen from FIGS. 5 and 6 that each of the screw shafts 66 will be moving in a counterclockwise direction at a constant speed while each of the nuts 65 will also be rotating counterclockwise at a speed governed by the current in its individual electrode. When the current in each electrode 40 is at the desired value, each of the screw shafts 66 and the nuts 65 will be rotating at the same speed so that there will be no relative movement therebetween.

Should the gap between one of the electrodes and the ingot 23 in the crucible 22 become too large, its electrode current will decrease and accordingly the derived voltage in the first field winding 106 will also decrease. As a result, a greater voltage output will be produced by the generator 105 so that the motor 85 will rotate at an increased speed and the nut 65 will begin rotating at a faster rate than the screw shaft 66 whereby downward movement of the nut 65 relative to the screw shaft 66 will begin. This will be transmitted from the nut 65 to the upper plate 62 and then to its associated lower plate 60 by means of the sleeves 61. Thus, the associated electrode ram will begin moving individually downward to move its electrode 40 into closer proximity to the ingot 23 and accordingly to increase its electrode current. As the electrode current increases, the voltage output of the generator 105 will decrease and the motor 85 will begin slowing down until the rotational speed of the nut 65 is again equal to that of the screw shaft 66 and the electrode 40 will again come to rest.

Should the gap between the electrode 40 and the ingot 23 become too short, on the other hand, causing an increase in electrode current, the derived voltage in the first field winding 106 of generator 105 will increase resulting in a reduced generator output and accordingly a slowing down of the motor 85. As a result, the nut 65 will rotate at a slower speed than that of the screw shaft 66 and hence will begin moving upwardly to move its electrode 40 away from the ingot 23 and to decrease the arc current. As the arc current decreases toward its correct value, the speed of motor 85 will increase to bring the rotational speed of the nut 65 into equality with that of the screw shaft 66 so that the electrode will come to rest.

While only a single embodiment has been shown and described it is not intended that the invention be limited thereby but only by the scope of the appended claims. In addition it will be appreciated that the illustrated electrode drive mechanism may also be employed to position the electrode in a single phase furnace by the use of a single D.C. motor 85 and differential device 59 along with the A.C. motor 81.

I claim:

1. A polyphase electric arc furnace having a furnace body, a plurality of electrode means mounted for movement into said furnace body, a polyphase electrical system coupled to said electrode means, a plurality of differential means, a different one of said differential means being operatively associated with each of said electrode means and each including first and second input means and output means coupled to its associated one of said electrode means wherein each electrode means is independently movable relative to said furnace body at a rate governed by the difference in the input motive quantities applied to its associated first and second input means, first motive means for simultaneously uniformly applying a first motive quantity to each of said first input means, a plurality of second motive means, each of said second motive means being coupled to a different one of said second input means for applying an independent motive quantity to each, and a plurality of control means, each of said control means being operatively coupled to a different one of said second motive means and to its associated electrode means for receiving an electric signal functionally related to at least one of the electrical quantities supplied to said electrode means by said polyphase system, each of said control means being constructed and arranged to individually actuate its associated second input means in accordance with its individual electrical signal thereby to individually raise and lower said electrode means.

2. A polyphase electric arc furnace having a furnace body, a plurality of electrode means mounted for movement into said furnace body, a polyphase electrical system coupled to said electrode means a plurality of differential means, a different one of said differential means being associated with each of said electrode means and each including a first portion movably mounted on its associated electrode means and a second portion movably mounted on said furnace body and operatively engaging said first portion thereof wherein each electrode moves relative to said furnace body at a rate governed by the difference in the rate of movement between said portions, first motive means for simultaneously moving one portion of each of said differential means uniformly in a manner tending to move all of said electrode means in one direction, a plurality of second motive means, each of said second motive means being operatively coupled to a different one of the other portions of said differential means for moving each independently in a manner tending to move its associated electrode means in an opposite direction, and a plurality of control means, each of said control means being operatively coupled to a different one of said second motive means and operatively connected to its associated electrode means for receiving an electrical signal functionally related to at least one of the electrical quantities supplied to said electrode means by said polyphase system, each of said control means being operative to individually actuate its associated second motive means in accordance with its individual electrical signal thereby to individually raise and lower said electrode means.

3. A polyphase electric arc melting furnace having a furnace body, a plurality of elongate electrode means mounted for longitudinal movement into said body, a polyphase electrical system connected to said electrode means for energizing the same, a plurality of differential screw means, one of said screw means being associated with each of said electrode means and each including a first portion rotatably mounted on its associated electrode means and a second portion rotatably mounted on said furnace body, first motive means for simultaneously rotating one portion of each of said screw means uniformly in a manner tending to move all of said electrode means in one direction, a plurality of second motive means, each of said second motive means being operatively coupled to a different one of the other portions of said screw means for rotating each independently in a manner tending to move its associated electrode means in an opposite direction, and control circuit means for each of said second motive means coupled to its associated electrode means for receiving an electrical signal functionally related to at least one of the electrical quantities supplied to said electrode means by said polyphase system, said control circuit means being operative to individually energize its associated one of said second motive means in accordance with its individual electrical signal thereby to individually raise and lower said electrode means.

4. A polyphase consumable electrode arc melting furnace having a sealed chamber, a plurality of electrode means extending into said chamber, a polyphase electrical system connected to said electrode means for energizing the same, threaded nut means rotatably mounted on each of said electrode means, screw shaft means threadably engaging each of said nut means, first motive means for simultaneously rotating each of said screw shaft means uniformly in a manner tending to move all of said electrode means in one direction, and a plurality of second motive means, one of said second motive means being operatively associated with a different one of said nut means for rotating each independently in a manner tending to move its associated electrode in an opposite direction, and energizing circuit means for each of said second motive means and coupled to its associated electrode means for receiving an electrical signal functionally related to at least one of the electrical quantities supplied to said electrode means by said polyphase system, said energizing circuit means being operative to individually energize its associated one of said second motive means in accordance with its individual electrical signal thereby to individually raise and lower said electrode means.

5. A polyphase consumable electrode arc melting furnace having a sealed chamber, a plurality of vertically disposed electrode means extending into said chamber, a polyphase electrical system connected to said electrode means for energizing the same, a top plate mounted on said chamber and vertically spaced therefrom, a cross plate fixedly attached to the upper end of each of said electrode means, a threaded nut means rotatably mounted on each of said cross plates, a screw shaft passing through each of said cross plates and engaging each of said nut means with its upper end rotatably supported by said top plate, first motive means for simultaneously rotating each of said screw shafts uniformly in a manner tending to move all of said electrode means in one direction, a plurality of second motive means, one of said second motive means being operatively associated with a different one of said nut means for rotating each independently in a manner tending to move its associated electrode means in an opposite direction, and control circuit means for each of said second motive means coupled to its associated electrode means for receiving an electrical signal functionally related to at least one of the electrical quantities supplied to said electrode means by said polyphase system, said control circuit means being operative to individually energize its associated one of said second motive means in accordance with its individual electrical signal thereby to individually raise and lower said electrode means.

6. A polyphase electric arc furnace having a furnace body, a plurality of electrode means mounted for movement into said furnace body, a polyphase electrical system connected to said electrode means for energizing the same, a plurality of differential means, one of said differential means being associated with each of said electrode means and each including first and second input means and output means operatively associated with one of said electrode means wherein each electrode means is movable relative to said furnace body at a rate governed by the difference in the input motive quantities applied to its associated first and second input means, an A.C. motor for uniformly applying a first motive quantity to each of said first input means, a plurality of D.C. motors, one of said D.C. motors being coupled to a different one of said second input means for applying an independent motive quantity to each, and energizing circuit means for each of said D.C. motors coupled to its associated electrode means, control means for receiving an electrical signal functionally related to at least one of the electrical quantities supplied to said electrode means by said polyphase system, said control means being constructed and arranged to individually excite its associated D.C. motor in accordance with its individual electric signal thereby to individually raise and lower said electrode means.

7. A polyphase electric arc melting furnace having a furnace body, a plurality of electrode means extending into said body, a polyphase electrical system connected to said electrode means for energizing the same, threaded nut means rotatably mounted on each of said electrode means, screw shaft means threadably engaging each of said nut means, an A.C. motor for simultaneously rotating each of said screw shaft means uniformly in a manner tending to move all of said electrode means in one direction, and a plurality of D.C. motors, a different one of said D.C. motors being operatively associated with each of said nut means for rotating each independently in a manner tending to move its associated electrode in an opposite direction, and energizing circuit means for the excitation of said D.C. motors and being coupled to its associated electrode means for receiving an electrical signal functionally related to at least one of the electrical quantities supplied to said electrode means by said polyphase system, said energizing circuit means being operative for individually exciting each of said D.C. motors in accordance with its individual electrical signal thereby to individually raise and lower said electrodes.

8. A polyphase consumable electrode arc melting furnace having a sealed chamber, a plurality of electrode means passing into said chamber, polyphase circuit means connected to each of said electrode means, stationary support means, a plurality of differential means each associated with one of said electrode means and each including a first portion rotatably mounted on its associated electrode means and a second portion rotatably mounted on said stationary support means, each of said differential means being constructed and arranged to move its associated electrode means relative to said stationary support means in accordance with the difference between the speed at which each of its associated portions rotate, an A.C. motor for simultaneously rotating each of one of said first and second portions uniformly in a manner tending to move all of said electrode means in one direction, a plurality of D.C. motors, each of said D.C. motors being operatively associated with a different one of the other of said first and second portions for rotating each independently in a manner tending to move its associated electrode in an opposite direction, and energizing circuit means for each of said D.C. motors coupled to said polyphase circuit means for receiving an electrical signal functionally related to at least one of the electrical quantities supplied to its associated electrode means by said polyphase circuit means, said energizing circuit means being operative to individually energize its associated D.C. motor in accordance with its individual electrical signal thereby to individually raise and lower said electrode means.

9. A polyphase consumable electrode arc melting furnace having a sealed chamber, a cover plate enclosing the top of said furnace chamber, a plurality of hollow electrode rams passing through said cover plate and each being constructed and arranged to support a consumable electrode within said furnace, polyphase circuit means connected to each of said rams, a top plate mounted on said chamber and disposed vertically above said cover plate, a plurality of cross plates each fixedly attached to the top of one of said electrode rams, a threaded nut rotatably mounted on each of said cross plates and aligned with the electrode rams attached thereto, a screw shaft passing through each of said cross plates and engaging said nut with its upper end rotatably supported by said top plate and with its lower end disposed within one of said electrode rams, an A.C. motor for simultaneously rotating each of said screw shafts uniformly in a manner tending to move all of said electrode means in one direction, a plurality of D.C. motors, one of said D.C. motors being operatively associated with a different one of said nut means for rotating each independently in a manner tending to move its associated electrode in an opposite direction, and energizing circuit means for each of said D.C. motors and coupled to said polyphase circuit means for receiving an electrical signal functionally related to at least one of the electrical quantities supplied to its associated electrode means, said energizing circuit means being operative to individually excite its associated D.C. motor in accordance with its individual electrical signal thereby to individually raise and lower said electrode rams.

10. A three phase consumable electrode arc melting furnace having a sealed chamber, a cover plate enclosing the top of said furnace chamber, three hollow electrode rams passing through said cover plate and each being constructed and arranged to support a consumable electrode within said furnace, polyphase circuit means connected to each of said rams, a top plate disposed vertically above said cover plate and having three gear means rotatably mounted thereon, a plurality of cross plates each fixedly attached to the top of one of said electrode rams, a threaded nut rotatably mounted on each of said cross plates and aligned with the electrode ram attached thereto, a screw shaft passing through each of said cross plates and engaging said nut with its upper end rotatably supported by said top plate and each engaging one of said gear means, an A.C. motor having an output pinion operatively engaging each of said gear means for simultaneously rotating each of said screw shafts uniformly in a manner tending to move all of said electrode rams in one direction, three D.C. motors, three belt drive means one of which connects each of said D.C. motors with a different one of said nut means for rotating each independently in a manner tending to move its associated electrode ram in an opposite direction, and control circuit means for each of said D.C. motors coupled to said polyphase circuit means for receiving an electrical signal functionally related to at least one of the electrical quantities supplied to its associated electrode ram, said control circuit means being operative to individually excite its associated D.C. motor in accordance with its individual electrical signal thereby to individually raise and lower said electrode rams.

References Cited by the Examiner
UNITED STATES PATENTS

| | | | |
|---|---|---|---|
| 2,630,022 | 3/1953 | Terdina | 74—424 |
| 2,848,524 | 8/1958 | McLaughlin et al. | 13—31 |
| 2,867,743 | 1/1959 | Needham et al. | 314—62 X |
| 3,080,499 | 2/1963 | Cooper | 313—357 |

RICHARD M. WOOD, *Primary Examiner.*

JOSEPH V. TRUHE, ANTHONY BARTIS, *Examiners.*